US008627763B2

(12) United States Patent
Theodos et al.

(10) Patent No.: US 8,627,763 B2
(45) Date of Patent: Jan. 14, 2014

(54) AUTOMATIC TOP-OFF FOR DEEP FAT FRYERS

(75) Inventors: Michael A. Theodos, Bossier City, LA (US); Charles Milton Hutchinson, Shreveport, LA (US)

(73) Assignee: Frymaster L.L.C., Shreveport, LA (US)

( * ) Notice: Subject to any disclaimer, the term of this patent is extended or adjusted under 35 U.S.C. 154(b) by 1379 days.

(21) Appl. No.: 11/897,846

(22) Filed: Aug. 31, 2007

(65) Prior Publication Data

US 2008/0229934 A1    Sep. 25, 2008

Related U.S. Application Data

(60) Provisional application No. 60/918,843, filed on Mar. 19, 2007.

(51) Int. Cl.
*A47J 37/12* (2006.01)

(52) U.S. Cl.
USPC .............................................. 99/330; 99/403

(58) Field of Classification Search
USPC .................. 99/330, 403, 280, 281, 300, 407; 392/442, 449, 451, 498
See application file for complete search history.

(56) References Cited

U.S. PATENT DOCUMENTS

| | | | | |
|---|---|---|---|---|
| 2,593,392 A | | 4/1952 | Budlane et al. ................. | 99/331 |
| 3,797,378 A | | 3/1974 | Morris ............................ | 99/408 |
| 5,069,116 A | * | 12/1991 | Marquez et al. ................ | 99/330 |
| 5,445,062 A | | 8/1995 | Polster ............................ | 99/348 |
| 5,586,486 A | * | 12/1996 | Nitschke et al. ................ | 99/330 |
| 5,617,777 A | | 4/1997 | Davis et al. .................... | 99/408 |
| 5,776,530 A | | 7/1998 | Davis et al. .................... | 426/233 |
| 5,973,297 A | | 10/1999 | Winter et al. .................. | 219/441 |
| 6,009,794 A | * | 1/2000 | Casey et al. .................... | 99/330 |
| 6,470,794 B2 | * | 10/2002 | Takahashi ....................... | 99/408 |
| 2003/0047084 A1 | * | 3/2003 | Shandross ....................... | 99/330 |
| 2004/0112225 A1 | | 6/2004 | Mercer et al. .................. | 99/330 |
| 2008/0213446 A1 | * | 9/2008 | Feinberg et al. ............... | 426/417 |

FOREIGN PATENT DOCUMENTS

WO    WO 2006065564 A2    6/2006

OTHER PUBLICATIONS

European Search Report Corresponding to European Application No. EP08101575, Dated Jun. 9, 2008.
International Search Report and Written Opinion dated Jun. 25, 2008 based on PCT application No. PCT/US08/03559.
First Office Action Issued Mar. 16, 2011 in Corresponding Chinese Application for Invention No. 200880015402.1.
Second Office Action Issued Mar. 28, 2012 in Corresponding Chinese Application for Invention No. 200880015402.1.
Written Opinion Mailed Feb. 15, 2011 by Hungarian Patent Office in Corresponding Singapore Application No. 200906089-8.
First Office Action Mailed Dec. 5, 2011 in Corresponding Mexican Application No. MX/a/2009/009829.
Second Office Action Mailed Apr. 10, 2012 in Corresponding Mexican Application No. MX/a/2009/009829.

* cited by examiner

*Primary Examiner* — Reginald L Alexander
(74) *Attorney, Agent, or Firm* — Ohlandt, Greeley, Ruggiero & Perle, L.L.P.

(57) ABSTRACT

A system for automatically filling and maintaining fryer pots with oil in a deep fryer having a deep fryer and a plurality of fryer pots disposed within the deep fryer. Each of the plurality of fryer pots contains a first temperature sensor and a second temperature sensor. The second temperature sensor is enabled to commence a filling cycle of a fryer pot in response to said first temperature sensor when said first temperature sensor senses a first predetermined temperature.

28 Claims, 6 Drawing Sheets

AUTOMATIC TOP-OFF FOR DEEP FAT FRYERS

This application claims benefit of U.S. Provisional Patent Application Ser. No. 60/918,843 filed on Mar. 19, 2007, the contents of which are incorporated by reference herein.

BACKGROUND OF THE INVENTION

1. Field of the Invention

This disclosure relates to deep fat fryers for the food service industry. More particularly, this disclosure relates to deep fat fryers for the food service industry that are capable of filling and maintaining a volume of cooking oil in a cooking receptacle. Still more particularly, this disclosure relates to deep fat fryers that are capable of filling and maintaining a volume of cooking oil in a cooking receptacle depending upon a sensed temperature of the oil.

2. Description of Related Art

Deep fryers are a necessity of the food service industry and particularly for the fast food service industry. For quick cooking of foods, the cooking oil must be filled in the cooking pot and be of a particular temperature at all times. During the cooking process much of the oil is absorbed by a food product, resulting in loss of oil volume. Furthermore, the rate of temperature rise is directly related to shortened oil life. Accordingly, there is a need to keep the volume of oil at optimal levels during the cooking process to minimize oil degradation caused by the heating process. Thus there is a need to keep the fryer full of oil at all times during the cooking process. Without an automatic system to maintain the oil at an optimal level and optimal temperature the operator could overlook the oil volume while cooking and reduce the effective life of the cooking oil.

Accordingly, there is a need for a deep fryer that fills and maintains the desired cooking oil volume and temperature for commercial deep fat fryers without operator intervention.

SUMMARY OF THE INVENTION

The present disclosure provides for a deep fryer that fills and maintains the volume of cooking oil in a fryer pot in response to a temperature sensor in a particular pot.

The present disclosure also provides for a deep fryer that fills and maintains the volume of oil in one or more of a plurality of fryer pots in a deep fryer in response to a temperature sensor in one or more of the particular pots.

The present disclosure further provides for a deep fryer that fills and maintains the volume of cooking oil in one or more of a plurality of fryer pots in a deep fryer only when a temperature sensor in one or the plurality of fryer pots detects a predetermined high temperature of cooking oil.

The present disclosure further provides for a deep fryer that activates a pump and a solenoid valve associated with a particular fryer pot to fill and maintain the volume of cooking oil in the fryer pot only when a temperature sensor associated with the fryer pot detects a predetermined high temperature of cooking oil.

The present disclosure further provides for a deep fryer that activates a pump and a solenoid valve associated with one or more of a plurality of fryer pots to fill and maintain the volume of cooking oil only when a temperature sensor associated with the one or more fryer pots detects that the cooking oil has reached a predetermined temperature.

The present disclosure still further provides for a deep fryer that fills and maintains the volume of cooking oil in one or a plurality of fryer pots when a predetermined low temperature has been detected when the oil level has dropped in the pot, wherein a temperature sensor activates a pump and a solenoid valve is opened in a particular fryer pot to commence filling.

The present disclosure provides for a deep fryer that stops filling in a fryer pot when a predetermined oil temperature is detected.

The present disclosure provides for a deep fryer that provides a heating element in a fryer pot having a temperature sensor connected thereto to sense oil temperature, the sensed temperature activating another sensor that detects oil temperature in response to oil level in the fryer pot to commence or cease filling of the fryer pot.

The present disclosure further provides for a deep fryer that introduces new oil into one or more of the plurality of fryer pots in response to a low level of oil in a particular pot, the oil being introduced above the oil line by means of separate piping to minimize new oil contamination by used oil.

The present disclosure yet provides for a deep fryer having two pumps; one of the two pumps for pumping new cooking oil above the oil line and the other of the two pumps for filtering used cooking oil.

The present disclosure still yet further provides for a deep fryer having two separate oil supply lines for piping new and used oil independently to the fryer pots such that new and used oil will not contact one another until pumped into a particular fryer pot.

The present disclosure provides for a deep fryer having a fillable reservoir that is fixed in the deep fryer housing.

The present disclosure provides for a deep fryer that is controlled by a circuit of temperature activated switches and mechanical contacts that fill and maintain the volume of cooking oil in fryer pots of a deep fryer.

Accordingly, there is a need for a deep fryer having a plurality of fryer pots that are separately fillable in response to a submersible oil level sensor in each pot; the submersible temperature sensor in each pot being engaged by a temperature sensor in each pot.

These and other benefits and advantages are provided by a system for automatically filling and maintaining fryer pots with oil in a deep fryer having a deep fryer and a plurality of fryer pots disposed within the deep fryer. Each of the plurality of fryer pots contains a first temperature sensor and a second temperature sensor. The second temperature sensor is enabled to commence a filling cycle of a fryer pot in response to said first temperature sensor when said first temperature sensor senses a first predetermined temperature.

A system for automatically filling and maintaining fryer pots with oil in a deep fryer. The deep fryer has a plurality of fryer pots and each of the plurality of fryer pots contains a first thermal switch and a second thermal switch. The system further provides for a pump and a plurality of valves that are associated with ones of the plurality of fryer pots. The second thermal switch in ones of the plurality of fryer pots is enabled by the first thermal switch in ones of the plurality of fryer pots to commence a filling cycle of a fryer pot in response to a first predetermined temperature. The second thermal switch opens the pump and ones of the plurality of valves in response to a second predetermined temperature.

A system for automatically filling and maintaining fryer pots with oil in a deep fryer having a deep fryer; a plurality of fryer pots. Each of the plurality of fryer pots has a first thermal switch, a second thermal switch a pump and a plurality of valves. The second thermal switch in ones of the plurality of fryer pots is enabled by the first thermal switch in ones of the plurality of fryer pots to commence a filling cycle of a fryer pot in response to a first predetermined temperature. The second thermal switch opens the pump and ones of the plurality of valves to provide oil to the fryer pot in response to a second predetermined temperature and closes the pump and ones of said plurality of valves in response to a third predetermined temperature.

BRIEF DESCRIPTION OF THE DRAWINGS

Other and further benefits, advantages and features of the present invention will be understood by reference to the following specification in conjunction with the accompanying drawings, in which like reference characters denote like elements of structure and.

DETAILED DESCRIPTION OF THE PREFERRED EMBODIMENT

Figure 1:
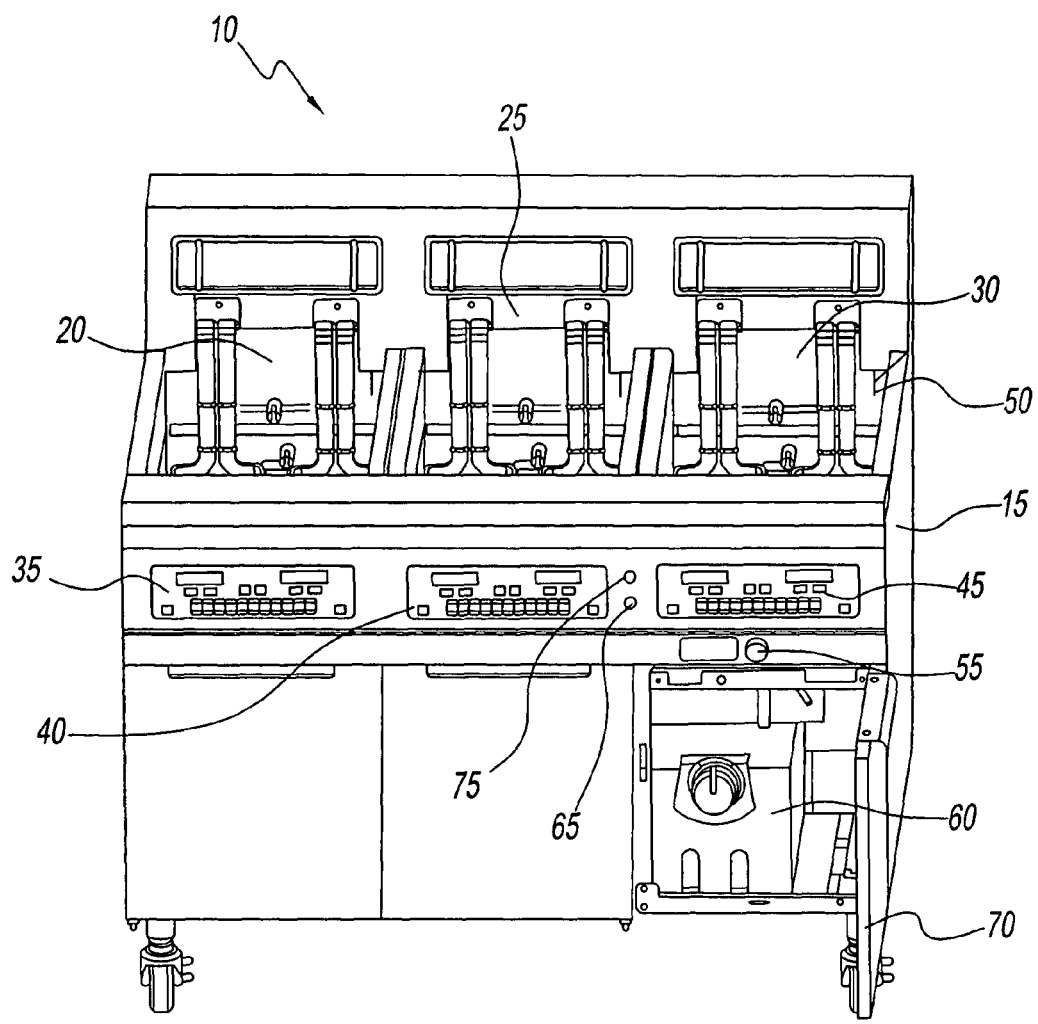
FIG. 1 illustrates a front view of the deep fryer having three fryer pots an internal fixed reservoir according to the present invention.

Referring to FIG. 1, a front perspective view of a deep fryer is shown, and generally referred to by reference numeral 10. Deep fryer 10 has a housing 15 and three deep fryer pots 20, 25 and 30. Pots 20, 25 and 30 each contains oil for deep frying foods commonly used in the commercial food industry. Pots 20, 25 and 30 each have a dedicated control panel 35, 40 and 45, respectively, that controls aspects of cooking for the particular pot. Housing 15 also has fill tubes 50 associated with each of the particular pots 20, 25 and 30 that are individually controllable. Housing 15 also has at its front a power button 55, an oil reservoir 60 and an indicator lamp 65 operatively associated with oil reservoir 60. Housing 15 also has individual doors 70 that are opened to provide access to oil reservoir 60. Further doors 70 can also be opened and used for periodic maintenance necessary for commercial cooking systems. Housing 15 also has an indicator lamp 75 energized by control panels 35, 40, and 45 at a predetermined time to indicate the need for filtration. While housing 15 is shown having three fryer pots, the housing could contain any number of fryer pots depending upon the needs of the food service professional.

Figure 2:
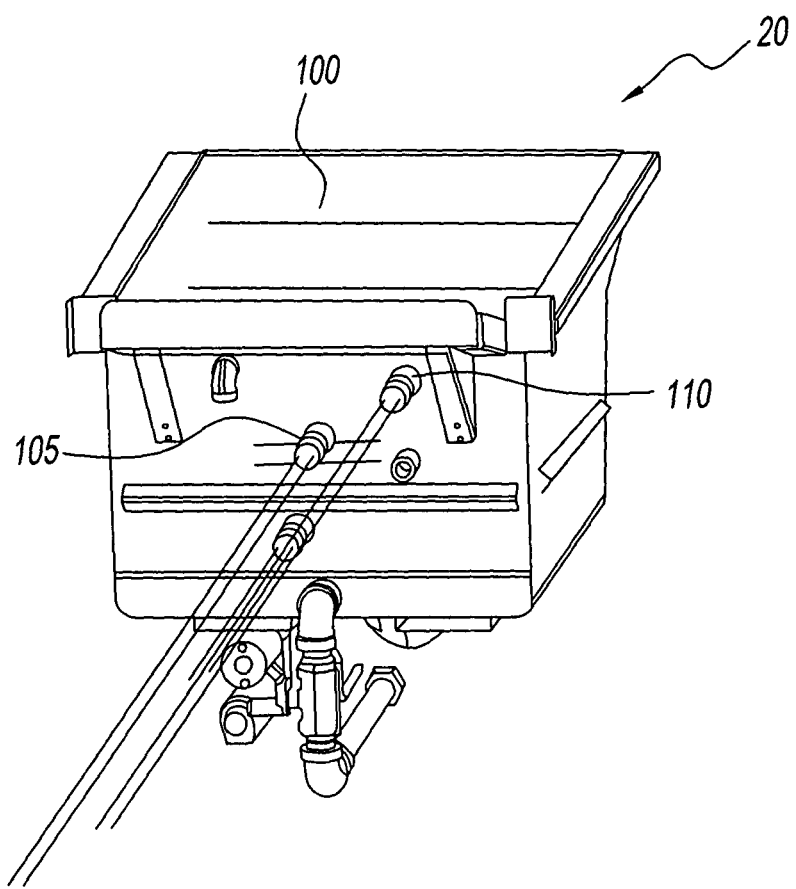
FIG. 2 illustrates a rear perspective view of a fryer pot having temperature sensors, according to the present invention.
Figure 3:
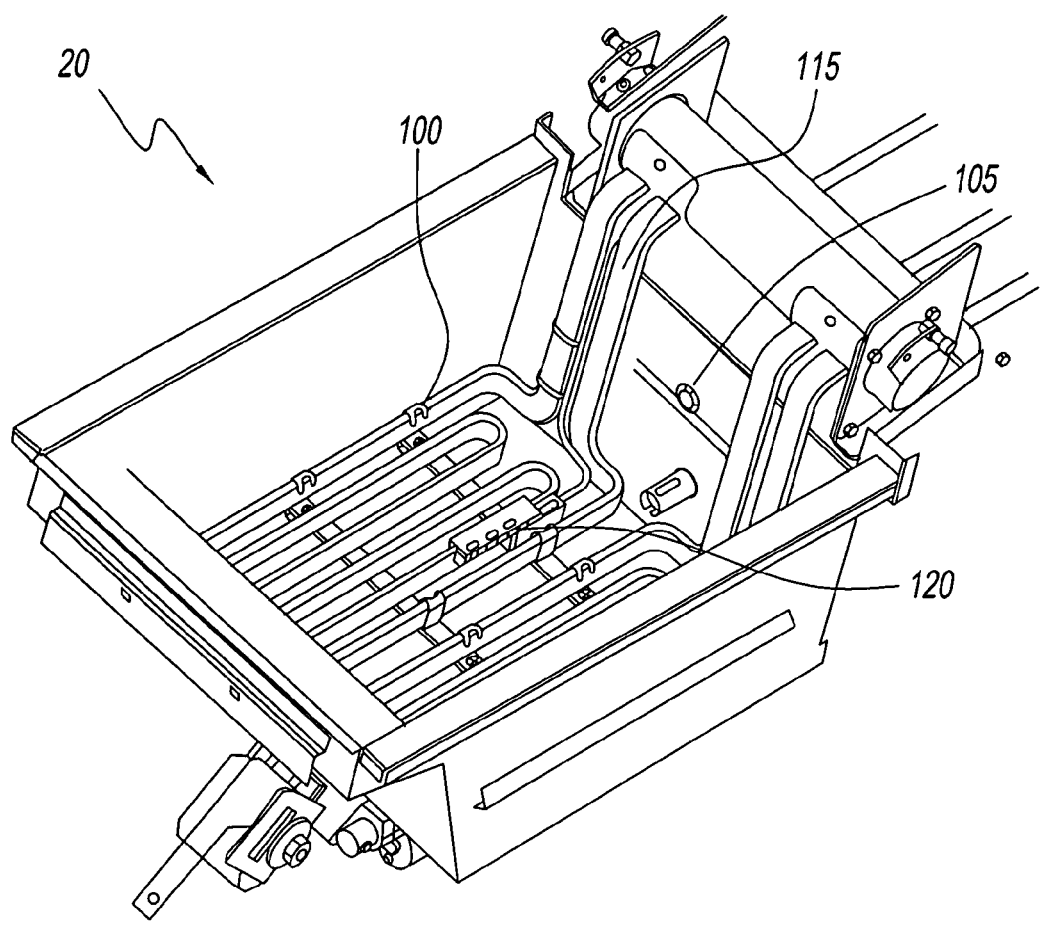
FIG. 3 illustrates a front perspective view of the a fryer pot having a heating element and a temperature sensor according to the present invention.

Referring to FIGS. 2 and 3, an individual deep fryer pot 20 is shown. Deep fryer pots 25 and 30 of FIG. 1 each have the same elements and function as deep fryer pot 20. Deep fryer pot 20 has a cooking area 100 and a submersible thermal sensor 105. Pot 20 also has a submersible safety thermal sensor 110 and an internal heating element 115. Heating element 115 has a temperature sensor 120 associated therewith.

In another embodiment, sensors 105, 110 and 120 are each a temperature sensor. In still other embodiments, sensors 105, 110 and 120 are each a thermal switch.

Figure 4:
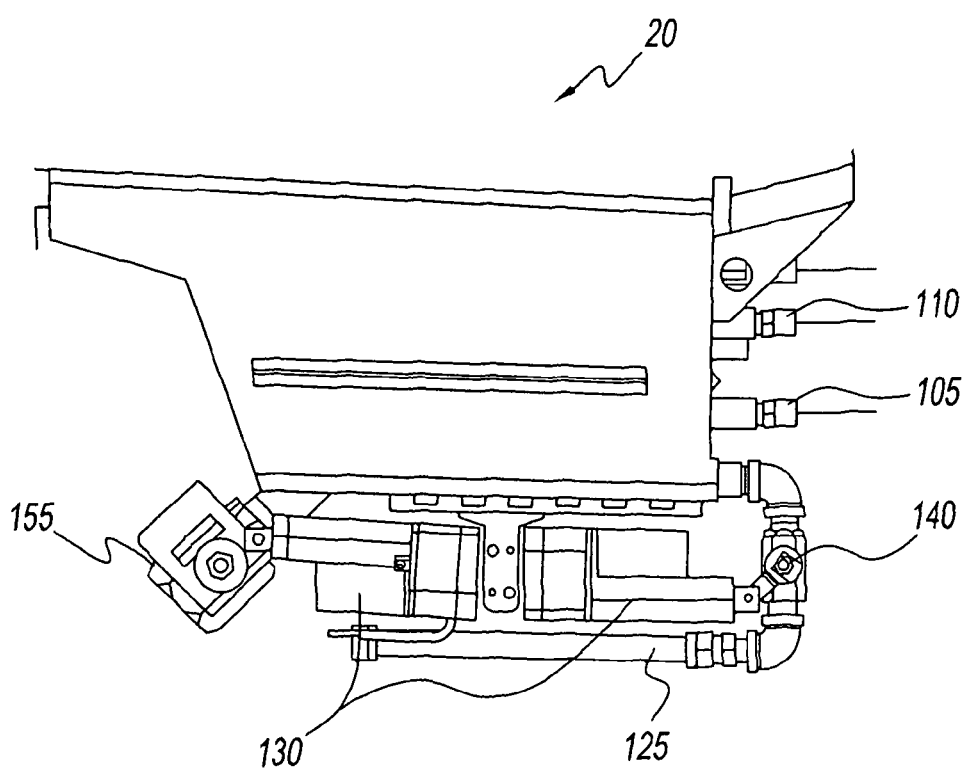
FIG. 4 illustrates a side view of the fryer pot having temperature sensors, linear motion motors, and drain and fill valves, according to the present invention.
Figure 5:
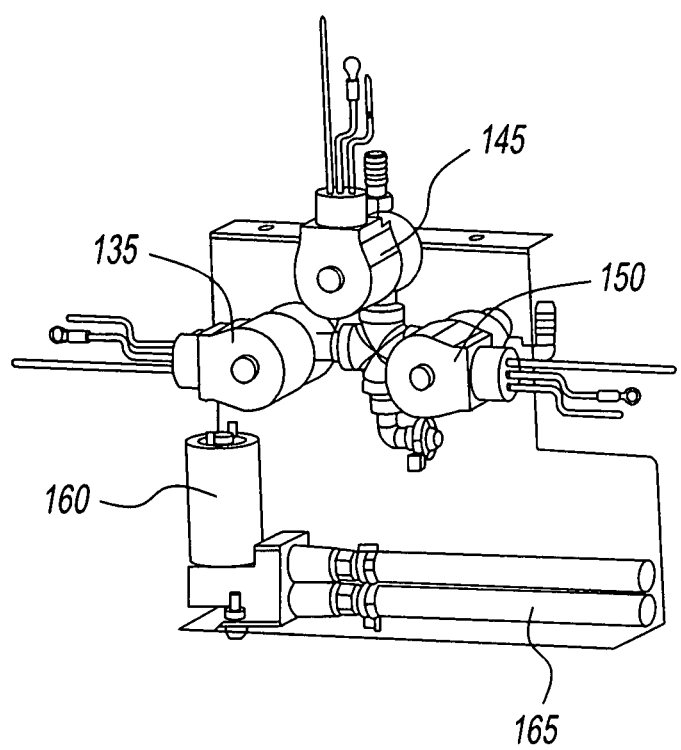
FIG. 5 illustrates the three solenoid valves that are each separately activated to fill respective fryer pots and the pump, according to the present invention.

Referring to FIGS. 1, 4 and 5, pot 20 has a drain valve 155 driven by one of a pair of linear motion motors 130 that drains used oil from pot 20. Pot 20 also has a pipe system 125 that feeds used oil into pot 20 via an oil return valve 140 driven by the other of the pair of linear motion motors 130. Individual pot 20 has a remotely located solenoid valve 135 and pump 160 associated therewith that operates to feed new oil to pot 20 through piping 165 terminating at the fill tubes 50. Piping 165 is separate from piping 125 that feeds used oil to pot 20. Solenoid valve 135 is opened and closed in response to submersible thermal sensor 105. Pump 160 is also operatively associated with submersible thermal sensor 105 to operate in response to a predetermined temperature.

As shown in FIG. 5, there are three solenoid valves 135, 145 and 150. Solenoid valves 145 and 150 are operatively connected to fill pots 25 and 30, respectively, in response to respective submersible thermal sensors disposed in those pots. Pump 160 serves three solenoid valves 135, 145 and 150 depending upon the level of cooking oil in a respective pot.

Operation will be described with respect to fryer pot 20. In operation, new oil pump 160 can only be enabled by submersible thermal sensor 105 to commence automatically filling of fryer pot 20 once temperature sensor 120 located near heating element 115 detects that a first predetermined temperature is reached. This first predetermined temperature is in a range of from approximately 250° F. to 280° F. For example, if temperature sensor 120 senses an oil temperature of approximately 260° F., submersible thermal sensor 105 is enabled to energize solenoid valve 135 and new oil pump 160. Submersible thermal sensor 105 will energize solenoid valve 135 and new oil pump 160 only at predetermined temperatures described below. The purpose of monitoring temperature sensor 120 is to prevent premature operation of pump 160 and inappropriately filling of pot 20 and a possible over fill scenario. Additionally, the volume of cool oil is much lower than that of hot oil. Temperature sensor 120 will also prevent pump 160 from prematurely engaging during the startup period when the oil volume is low because of the relatively low temperature. Further, when sensor 120 senses a temperature lower than approximately 5° F. to 25° F. below the first predetermined temperature, then submersible thermal sensor 105 will not be enabled to energize pump 160, thus preventing topping off a system that is drained or not in use.

Once temperature sensor 120 senses a second predetermined temperature in a range of from approximately 260° F. to 290° F., submersible thermal sensor 105, a switch, can be engaged. When submersible thermal sensor 105 senses a temperature in this second range, it will close and activate pump 160 and solenoid valve 135. A temperature in this range indicates to submersible thermal sensor 105 that it is no longer submersed in oil and that filling must begin to return the proper oil volume to pot 20. While new cooking oil is being introduced into pot 20, it is also being heated by heating element 115. Once submersible thermal sensor 105 senses a third predetermined temperature in a range of from approximately 300° F. to 330° F., it will open, and thus stop the filling of pot 20. A temperature in this third range indicates that submersible thermal sensor 105 is again immersed in oil and that pot 20 has the desired oil volume. Submersible thermal sensor 105 is wired to solenoid valve 135 to ensure that the appropriate fryer pot 20 will be filled and not one of the other fryer pots 25 or 30 in housing 15.

If submersible thermal sensor 105 fails to stop operation of pump 160, sensor 110, a second submersible safety thermal sensor 110 that is located higher in pot 20, is activated. Submersible safety thermal sensor 110 is wired in series electrically with pump 160 to stop the filling operation. The second submersible safety thermal sensor 110 acts as a safety feature to prevent pot 20 from overflowing should submersible thermal sensor 105 not stop pump operation. Further, an additional safety feature is an off delay timer operatively associated with pump 160 to stop its operation and prevent overflow. Submersible safety sensor 110 also preserves pump life in the event that there is a low level of oil in reservoir or the reservoir oil in not replaced by the user.

While the filling system has been described as having a immersed temperature sensor 120 associated with heating element 115, temperature sensor 120 could also have been located on a side of fryer pot 20 to sense a temperature at the surface of fryer pot 20 as well.

When new oil is fed into fry pot 20, it comes in above the oil line through separate piping 165 and terminating at fill tubes 50, preventing the new oil from coming in contact with used oil and from being contaminated before it enters pot 20. By having a higher entry point, the possibility of disturbing crumbs at the bottom of pot 20 is eliminated. Further, higher entry point reduces the likelihood that solenoid valves 135, 145 and 150 will become clogged.

Figure 6:
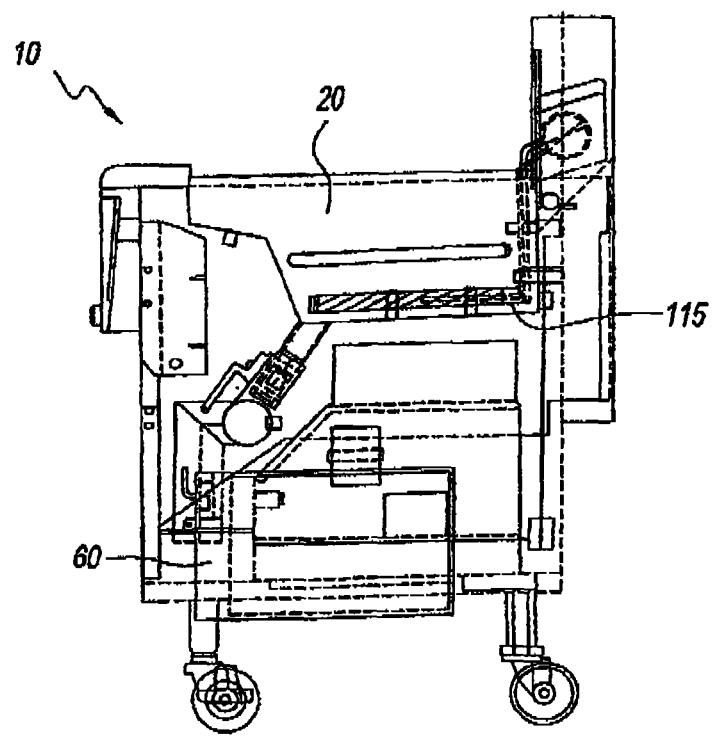
FIG. 6 illustrates a side view of the deep fryer housing, according to the present invention.
Figure 7:
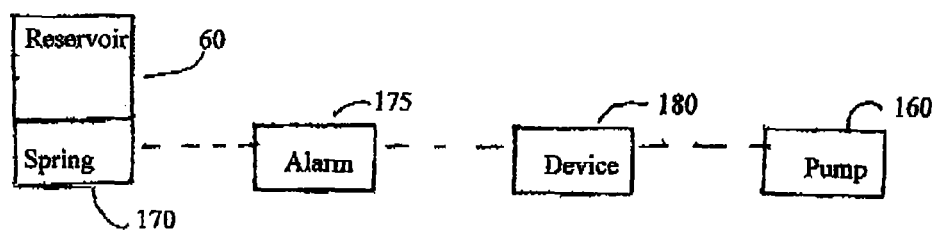
FIG. 7 is a block diagram of an alarm system of the deep fryer.

Referring to FIGS. 1, 6 and 7, the housing 15 and reservoir 60 are shown. The oil used to fill fry pots 20, 25 and 30 is located in reservoir 60. To alert a user that oil in reservoir 60 is at a low level, a device, such as a spring 170 on which reservoir 60 rests, expands to raise reservoir 60 and activate an alarm or light 175. Alternatively, alarm or light 175 may be activated by a device 180, such as an off delay timer, operatively associated with pump 160 that detects that the predetermined expected interval to refill the fryer pot has been exceeded, indicating reservoir 60 is empty. Then the individual reservoir is removed and a new filled reservoir is inserted. Alternatively, a single permanent reservoir is placed below all fryer pots 20, 25 and 30 and the permanent reservoir is filled.

The present invention having been thus described with particular reference to the preferred forms thereof, it will be obvious that various changes and modifications may be made therein without departing from the spirit and scope of the present invention as defined in the disclosure.

We claim:

1. A system for automatically filling and maintaining fryer pots with oil in a deep fryer comprising:
    a deep fryer;
    a reservoir containing cooking oil;
    a plurality of fryer pots disposed within said deep fryer, each of said plurality of fryer pots containing a first temperature sensor and a second temperature sensor, wherein said first temperature sensor enables operation of said second temperature sensor based upon a first predetermined temperature sensed by said first temperature sensor, wherein said first predetermined temperature is indicative of the presence of oil in the fryer pot
    a pump and a plurality of valves, each of said plurality of valves being operatively associated with one of said plurality of fryer pots;
    an alarm that indicates said reservoir is empty; and
    a device that activates said alarm and that is associated with one of said pump and said reservoir.

2. The system according to claim 1, wherein said pump and ones of said plurality of valves are actuated when said second temperature sensor of said plurality of fryer pots senses a second predetermined temperature.

3. The system according to claim 2, wherein said pump and ones of said plurality of valves are deactivated when said second temperature sensor in each of said plurality of fryer pots senses a third predetermined temperature that is greater in value than said second predetermined temperature.

4. The system according to claim 2, wherein said second temperature sensor is not enabled to commence a filling cycle of a fryer pot when said first temperature sensor does not sense said first predetermined temperature.

5. The system according to claim 1, wherein said first temperature sensor is located proximate a heating element at a bottom surface of said fryer pot.

6. The system according to claim 5, wherein said second temperature sensor is located in said fryer pot at a location further from the bottom surface of said fryer pot than said first temperature sensor.

7. The system according to claim 1, wherein said first predetermined temperature ranges from approximately 250° F. to 280° F.

8. The system according to claim 2, wherein said second predetermined temperature ranges from approximately 260° F. to 290° F.

9. The system according to claim 1, wherein when said first temperature sensor senses a temperature in a range from approximately 5° F. to 25° F. below said first predetermined temperature, said first temperature sensor does not enable said second temperature sensor.

10. The system according to claim 2, wherein said plurality of valves are a plurality of solenoid valves.

11. A system for automatically filling and maintaining fryer pots with oil in a deep fryer comprising:
    a deep fryer; and
    a plurality of fryer pots disposed within said deep fryer, each of said plurality of fryer pots containing a first temperature sensor and a second temperature sensor, wherein said first temperature sensor enables operation of said second temperature sensor based upon a first predetermined temperature sensed by said first temperature sensor, wherein said first predetermined temperature is indicative of the presence of oil in the fryer pot;
    a pump and a plurality of valves, each of said plurality of valves being operatively associated with one of said plurality of fryer pots, wherein said pump and ones of said plurality of valves are actuated when said second temperature sensor of said plurality of fryer pots senses a second predetermined temperature, and wherein said pump and ones of said plurality of valves are deactivated when said second temperature sensor in each of said plurality of fryer pots senses a third predetermined temperature that is greater in value than said second predetermined temperature; and
    a third temperature sensor in said fryer pot operatively associated with said second temperature sensor, wherein said third temperature sensor disables said second temperature sensor when said second temperature sensor does not detect said third predetermined temperature.

12. The system according to claim 11, wherein said third predetermined temperature ranges from approximately 300° F. to 330° F.

13. The system according to claim 11, wherein said first temperature sensor, said second temperature sensor and said third temperature sensor are mechanical thermal switches.

14. A system for automatically filling and maintaining fryer pots with oil in a deep fryer comprising:
    a deep fryer;
    a reservoir containing cooking oil;
    a plurality of fryer pots disposed within said deep fryer, each of said plurality of fryer pots containing a first thermal switch that senses a first predetermined temperature indicative of the presence of oil in said fryer pot and a second thermal switch; and a pump and a plurality of valves, each of said plurality of valves associated with one of said plurality of fryer pots to provide cooking oil to said pots;

wherein said second thermal switch in ones of said plurality of fryer pots is enabled to commence a filling cycle in a fryer pot after said first thermal switch senses said first predetermined temperature and said second thermal switch opens said pump and ones of said plurality of valves in response to a second predetermined temperature, and a spring upon which said reservoir sits, wherein as said pump removes oil from said reservoir, said spring expands to raise said reservoir.

15. The system according to claim 14, wherein said second thermal switch closes said pump and ones of said plurality of valves in response to a third predetermined temperature.

16. The system according to claim 14, wherein said first predetermined temperature ranges from approximately 250° F. to 280° F.

17. The system according to claim 14, wherein said second predetermined temperature ranges from approximately 260° F. to 290° F.

18. The system according to claim 14, wherein said third predetermined temperature ranges from approximately 300° F. to 330° F.

19. The system according to claim 14, wherein when said first temperature sensor senses a temperature in a range from approximately 5° F. to 25° F. below said first predetermined temperature, said first temperature sensor does not enable said second temperature sensor.

20. The system according to claim 14, wherein said spring is capable of activating an alarm after a predetermined degree of expansion to thereby indicate a low reservoir oil volume.

21. A system for automatically filling and maintaining fryer pots with oil in a deep fryer comprising:
a deep fryer;
a plurality of fryer pots disposed within said deep fryer, each of said plurality of fryer pots containing a first thermal switch that senses a first predetermined temperature indicative of the presence of oil in said fryer pot and a second thermal switch; and
a pump and a plurality of valves, each of said plurality of valves associated with one of said plurality of fryer pots, wherein said second thermal switch in ones of said plurality of fryer pots is enabled to commence a filling cycle in a fryer pot after said first thermal switch senses said first predetermined temperature and said second thermal switch opens said pump and ones of said plurality of valves in response to a second predetermined temperature, wherein said second thermal switch closes said pump and ones of said plurality of valves in response to a third predetermined temperature; and a third thermal switch that is operatively associated with said pump to deactivate said pump when said second thermal switch does not sense said third predetermined temperature.

22. A system for automatically filling and maintaining fryer pots with oil in a deep fryer comprising:
a deep fryer;
a reservoir containing cooking oil;
a timer that activates an alarm to indicate that said reservoir is empty;
a plurality of fryer pots disposed within said deep fryer, each of said plurality of fryer pots containing a first thermal switch that senses a first predetermined temperature indicative of the presence of oil in said fryer pot and a second thermal switch;
a pump and a plurality of valves, each of said plurality of valves associated with one of said plurality of fryer pots;
an alarm that indicates said reservoir is empty;
a device that activates said alarm and that is associated with one of said reservoir and said pump; and
wherein said second thermal switch in ones of said plurality of fryer pots is enabled by said first thermal switch in ones of said plurality of fryer pots to commence a filling cycle of a fryer pot when said first predetermined temperature is sensed and said second thermal switch opens said pump and ones of said plurality of valves to provide oil to said fryer pot in response to a second predetermined temperature.

23. The system according to claim 22, wherein a third predetermined temperature is sensed by said second thermal switch, and wherein said third predetermined temperature indicates that said second thermal switch is submerged in oil.

24. The system according to claim 23, further comprising a plurality of fill tubes, each of said plurality of fill tubes being disposed in one of said fryer pots, wherein each of said plurality of fill tubes is disposed higher than said oil level in said fryer pot.

25. The system according to claim 22, wherein said first predetermined temperature ranges from approximately 250° F. to 280° F.

26. The system according to claim 22, wherein said second predetermined temperature ranges from approximately 260° F. to 290° F.

27. The system according to claim 22, wherein said third predetermined temperature ranges from approximately 300° F. to 330° F.

28. The system according to claim 22, wherein when said first thermal switch senses a temperature in a range from approximately 5° F. to 25° F. below said first predetermined temperature, said first temperature sensor does not enable said second thermal switch.

* * * * *